Feb. 14, 1961     W. R. BELL, JR     2,971,312
FOIL FOLDER
Filed Feb. 16, 1959
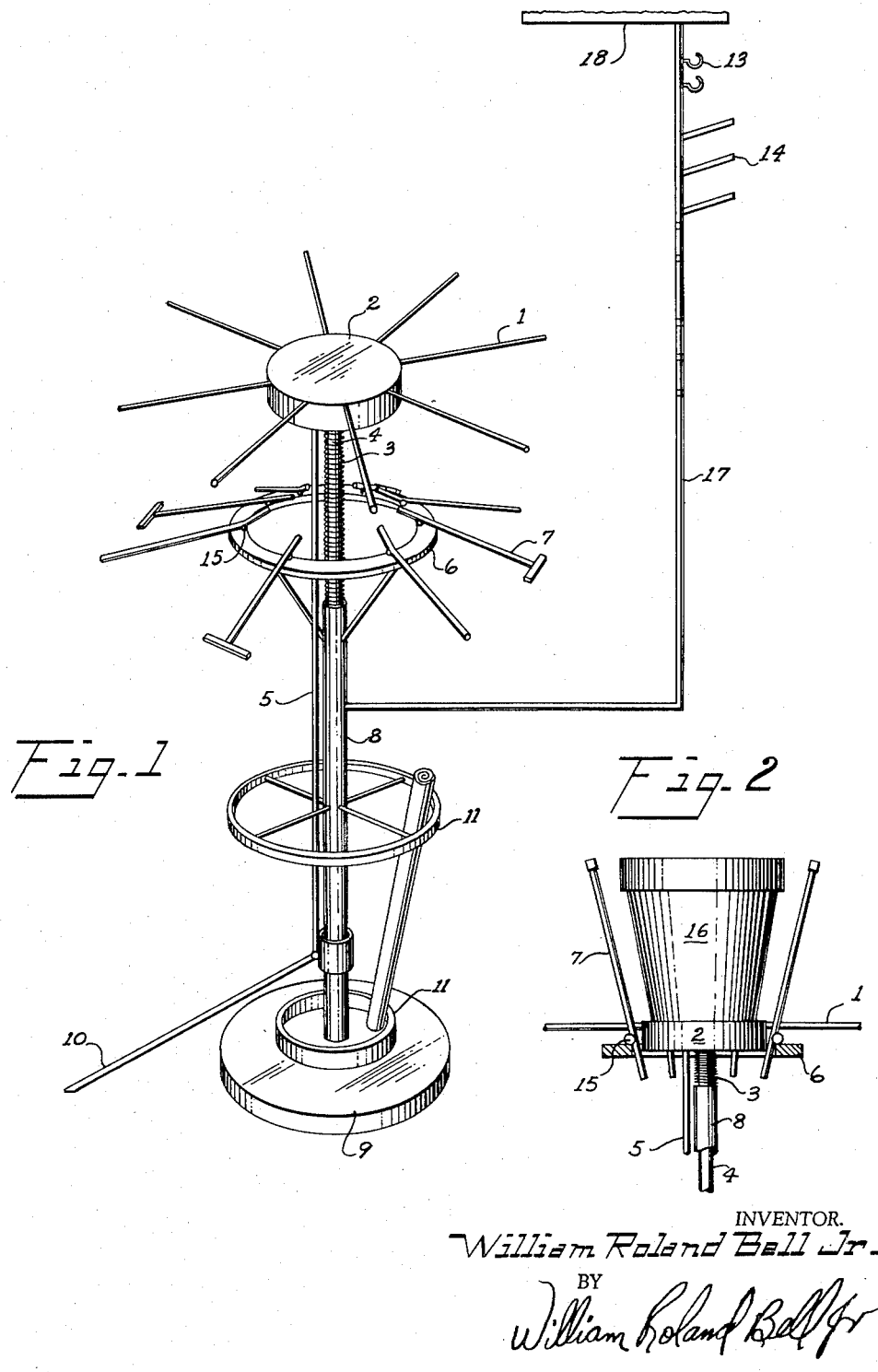
INVENTOR.
William Roland Bell Jr.
BY
William Roland Bell Jr.

2,971,312
FOIL FOLDER

William Roland Bell, Jr., 804 25th St., Snyder, Tex.

Filed Feb. 16, 1959, Ser. No. 793,433

4 Claims. (Cl. 53—390)

The invention relates to the forming of decorative foil around the pots of pot plants and containers of bouquet in the florist industry to add beauty to the products. The use of foil in color is an aid in bringing out the beauty of the flowers by contrasting or complementary color combinations, as well as hiding the objectionable and oft-times dirty containers and pots.

The objective therefore is to fashion a machine or jig-like structure which will fit the foil to the containers in a conservative as well as a decorative way, as well as the objective of lending speed to the operation. Another objective is the placing of a platform in a flowershop so as to centralize the pot wrapping department with provision close by to store and display the various paraphernalia of this department.

Further objectives will be apparent from the specifications and drawings in which:

Fig. 1 is a perspective view of a jig according to this invention.

Fig. 2 is a partial elevation, partially broken away showing the pot on the platform, the platform in a depressed position.

My foil folder is mounted upon a base 9 which, Fig. 1, supports the stand 8, being a pipe, which sleeves a rod 4 as a standard to the upper end of which is mounted the platform 2. The platform is approximate the size of the biggest pot or container found in flower shops and to the periphery of the platform 2 are secured rods mounted in a radial effect to form out a spider. Since the platform 2 must be small as required by the encountered parts of the jig, or mechanism, and since plants might tip over and fall to the floor, these radial rods 1, Fig. 1, and Fig. 2, are included.

The platform 2 of Fig. 1 is made to be normally raised by a spring 3 sleeved upon shaft 4. A pull rod 5 connected to foot pedal 10 allows the operator to lower the platform into the folding rods 7 and also serves as a guide to insure the radial rods of the spider 1 not being crossed with the folding rods 7.

The folding rods 7 are also radial in design and directed to pass between the radial rods of the spider 1 upon being lowered to a position where the platform 2, Fig. 1, strikes the hub portion of the folding rods 7 inside the circle of pivots of the folding rods at 15 and with pressure to make the folding rods pivot into a position more or less in parallel with the standard 4 until they strike the outside edge of the pot 16. Thus, if a square of tinfoil were placed upon the platform, then the pot placed upon the tin-foil supported by the platform, the whole recessed and lowered to strike the folding rods, a crimped and folded square of foil would result around the pot.

The folding rods 7 of Fig. 1 are eight in number as per the sketches of my drawing. They work quadripartite. The first set of four begin the folding operation ahead of the second set of four so as to begin the folding of the square of foil from the opposed sides. The second set of four following soon after to fold the corners up around the pot. The second set of four are T shaped in form with the T disposed at the perimeter of the quadrilateral and not at the hub. The first set of four are straight rod in form, see Fig. 4. The design of the two sets of four folding rods 7 are to allow the raising of the folded foil up and out of mesh upon the first set of four by the action of the last set of four, as the platform 2 is raised to normal starting and elevated position. The folding rods drop away from near parallel to standard 4 to open position and are supported upon a rest 6, Fig. 1, positioned to insure folding rods 7 being in the path of travel of platform 2 upon its downward path of travel.

Two circularly formed rods are mounted upon the base 9 and stand 8 resembling an umbrella holder in which the rolls of foil may be displayed. This holding rack 11 is depicted in Fig. 1. Also to stand 8 is mounted a rod 17 to the top of which is secured a blade 18, Fig. 1, which is used to cut the segment of foil from the roll, and rod 17 is further used to mount hooks 13 for scissors and spinnels at 14 upon which to impale spools of ribbon, and other accessories. The blade of the cutter 18 is serrated.

Many florists use the material "styrafoam" in the building of sprays and bouquets of flowers as a base into which the stems of the flowers and fern are stuck. The mechanism as described above will lend itself to the production of these styrafoam bases in a prescribed way which is the encompassing of mesh or "chicken" wire around the mass of styrafoam so as to give it rigidity and to help further stabilize the flower stems supported therein. However, the quantity of plants and containers sold as to the quantity of bases is much greater, yet the jig mechanism for the folding of foil will work equally well as is for the forming of "chicken" wire around a mass of styrafoam, etc.

Even though there is herein shown and described a preferred embodiment of the invention, the same is susceptible to certain changes fully comprehended by the spirit of the invention as herein described and within the scope of the appended claims.

I claim:

1. A machine for folding foil around an object comprising: a stand, a platform mounted for movement relative to the stand, a plurality of platform rods extending radially from the periphery of the platform, a rest secured to the stand, and a plurality of folding rods extending radially, the platform rods and folding rods radiating from a common axis, the folding rods each pivoted intermediate their ends to the rest so that each folding rod has a hub end between the pivot and axis of radiation, the hub end of each rod in the path of travel of the platform; so arranged and constructed that as the platform is moved it contacts the hub end of the folding rods causing the other end of the folding rods to clamp foil around an object on the foil which is on the platform rods.

2. The invention as defined in claim 1 wherein some of the folding rods are straight and some are T shaped.

3. The invention as defined in claim 2 with the addition of means to cause the straight folding rods to pivot before the T shaped rods pivot.

4. A machine for folding foil around an object comprising: an elongated stand vertically disposed, a platform, a plurality of platform rods radiating from the platform, the platform rods radiating from the axis of the stand, the platform mounted for movement along the axis of the stand, a rest securely attached to the stand below the platform, a plurality of folding rods pivoted intermediate their ends to the rest, the folding rods radiating from the axis of the stand, one end of each folding rod nearer the axis of the stand than the periphery of the platform, and the pivots of the folding rods further from the axis of the stand than the periphery of the platform, and means for moving the bottom of the platform to a level below the level of the pivots; so that the platform strikes the folding rods causing them to clamp foil around an object on the foil which is on the platform and platform rods.

References Cited in the file of this patent

UNITED STATES PATENTS

| | | |
|---|---|---|
| 1,810,156 | Brandenburg | June 16, 1931 |
| 1,931,787 | Borchert | Oct. 24, 1933 |
| 2,523,667 | Palmer et al. | Sept. 26, 1950 |